(12) United States Patent
Vock et al.

(10) Patent No.: US 11,386,568 B2
(45) Date of Patent: Jul. 12, 2022

(54) METHOD AND DEVICE FOR DETERMINING A QUALITY OF A SURFACE IN THE SURROUNDINGS OF A TRANSPORTATION VEHICLE

(71) Applicant: VOLKSWAGEN AG, Wolfsburg (DE)

(72) Inventors: Dominik Maximilian Martin Vock, Braunschweig (DE); Marc-Michael Meinecke, Sassenburg (DE); Fabian Warnecke, Wolfenbüttel (DE)

(73) Assignee: Volkswagen Aktiengesellschaft

( * ) Notice: Subject to any disclaimer, the term of this patent is extended or adjusted under 35 U.S.C. 154(b) by 309 days.

(21) Appl. No.: 16/627,036

(22) PCT Filed: Jun. 28, 2018

(86) PCT No.: PCT/EP2018/067445
§ 371 (c)(1),
(2) Date: Dec. 27, 2019

(87) PCT Pub. No.: WO2019/002482
PCT Pub. Date: Jan. 3, 2019

(65) Prior Publication Data
US 2020/0126247 A1    Apr. 23, 2020

(30) Foreign Application Priority Data

Jun. 29, 2017 (DE) .................... 10 2017 114 571.0

(51) Int. Cl.
*G06K 9/00* (2022.01)
*G06T 7/564* (2017.01)
(Continued)

(52) U.S. Cl.
CPC ............ *G06T 7/564* (2017.01); *B60W 40/06* (2013.01); *G01B 11/24* (2013.01); *G05D 1/0214* (2013.01);
(Continued)

(58) Field of Classification Search
CPC ................... G06T 7/564; G06T 7/593; G06T 2207/10012; G06T 2207/30261;
(Continued)

(56) References Cited

U.S. PATENT DOCUMENTS

2007/0219720 A1    9/2007  Trepagnier et al.
2013/0079990 A1*   3/2013  Fritsch .................... G06T 7/11
                                                   701/41
(Continued)

OTHER PUBLICATIONS

Broggi et al.; Terrain mapping for off-road Autonomous Ground Vehicles using rational B-Spline surfaces and stereo vision; 2013 IEEE Intelligent Vehicles Symposium (IV); IEEE; Jun. 23, 2013; pp. 648-653.
(Continued)

*Primary Examiner* — Dhaval V Patel
(74) *Attorney, Agent, or Firm* — Barnes & Thornburg, LLP

(57) ABSTRACT

A method for determining a quality of a surface in the surroundings of a transportation vehicle, wherein three-dimensional surface coordinates of the surface are generated using a sensor assembly. In the method, an approximation of the course of the curvature of the surface in at least one direction is obtained based on the surface coordinates and the surface coordinates are classified to characterize the quality of the surface using the course of the curvature and/or vertical distances of the approximation of the course of the curvature from the three-dimensional surface coordinates. A device for carrying out the method.

24 Claims, 7 Drawing Sheets

(51) Int. Cl.
    *G06T 7/593*     (2017.01)
    *B60W 40/06*     (2012.01)
    *G01B 11/24*     (2006.01)
    *G05D 1/02*     (2020.01)
    *G06V 20/58*     (2022.01)
    *G06V 20/56*     (2022.01)

(52) U.S. Cl.
    CPC ........... *G05D 1/0251* (2013.01); *G06T 7/593* (2017.01); *G06V 20/58* (2022.01); *G06V 20/588* (2022.01); *B60W 2420/42* (2013.01); *B60W 2552/00* (2020.02); *G05D 2201/0213* (2013.01); *G06T 2207/10012* (2013.01); *G06T 2207/30261* (2013.01)

(58) Field of Classification Search
    CPC ............. B60W 40/06; B60W 2420/42; B60W 2552/00; B60W 2050/143; B60W 2050/146; B60W 40/064; B60W 40/068; B60W 50/14; G01B 11/24; G01B 11/0608; G05D 1/0214; G05D 1/0251; G05D 2201/0213; G06K 9/00798; G06K 9/00805; G06K 9/00791; G01C 21/3602
See application file for complete search history.

(56) References Cited

U.S. PATENT DOCUMENTS

2015/0371095 A1* 12/2015 Hartmann .......... G06K 9/00791
                                                               348/148
2016/0325753 A1* 11/2016 Stein ........................ G06T 7/55
2017/0212522 A1* 7/2017 Chung .................. G01C 21/00

OTHER PUBLICATIONS

Jaspers et al.; Fast and robust b-spline terrain estimation for off-road navigation with stereo vision (abstract); 2014 IEEE International Conference on Autonomous Robot Systems and Competitions (ICARSC); IEEE; May 14, 2014; pp. 140-145.
Search Report for International Patent Application No. PCT/EP2018/067445; dated Oct. 15, 2018.

* cited by examiner

METHOD AND DEVICE FOR DETERMINING A QUALITY OF A SURFACE IN THE SURROUNDINGS OF A TRANSPORTATION VEHICLE

PRIORITY CLAIM

This patent application is a U.S. National Phase of International Patent Application No. PCT/EP2018/067445, filed 28 Jun. 2018, which claims priority to German Patent Application No. 10 2017 114 571.0, filed 29 Jun. 2017, the disclosures of which are incorporated herein by reference in their entireties.

SUMMARY

Illustrative embodiments relate to a method for determining a condition of a surface in the environment of a transportation vehicle. In the course of the method, three-dimensional surface coordinates of the surface are generated by a sensor arrangement. Illustrative embodiments further relate to a device for determining the condition of a surface in the environment of a transportation vehicle. The device includes a sensor arrangement by which three-dimensional surface coordinates of the surface are capable of being generated.

BRIEF DESCRIPTION OF THE DRAWINGS

Disclosed embodiments will be described in detail in the following on the basis of the appended figures.

DETAILED DESCRIPTION

Figure 1:
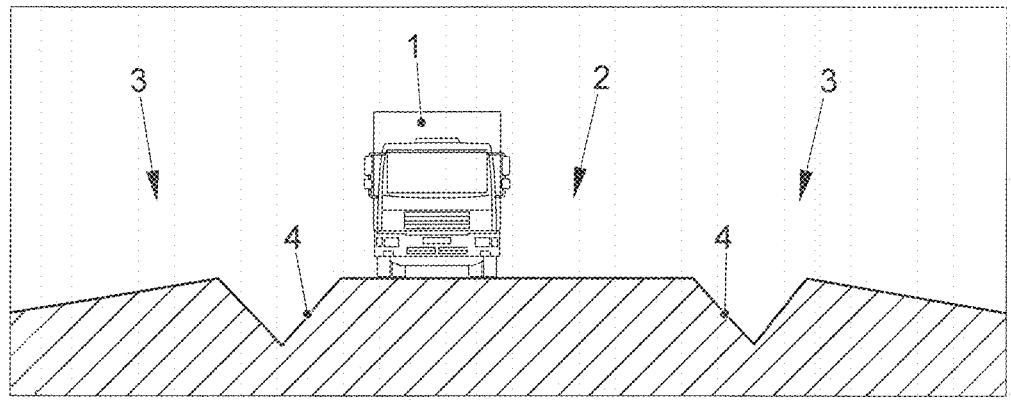
FIG. 1 shows a situation in which the disclosed method can be employed.

The disclosed method and the disclosed device are relevant, in particular, for transportation vehicles that drive automatically or semi-automatically on an unpaved roadway. In this case, it is particularly important that, for example, potholes, slopes, ditches, obstacles or such like are detected securely and reliably. Particularly in the case of an automatic driving of trucks, the condition of the undersurface to be driven over should be known as accurately as possible.

Sensor arrangements are known with which the surface of a roadway or of a roadway environment can be surveyed three-dimensionally. For applications such as the automatic driving of transportation vehicles, however, the measuring accuracy of these sensor arrangements is inadequate. Frequently the measurement noise is too intense, or too many measuring errors arise.

The disclosed embodiments specify a method and a device of the aforementioned type, with which the condition of the surface in the environment of a transportation vehicle, in particular, in the direction of travel of a transportation vehicle, can be determined more accurately.

In accordance with the disclosure, this is achieved by a method and by a device.

In the disclosed method, an approximation of the curvature contour of the surface in at least one direction is obtained on the basis of the three-dimensional surface coordinates, and a classification of the surface coordinates on the basis of the curvature contour and/or vertical separations of the approximation of the curvature contour from the three-dimensional surface coordinates is carried for the purpose of characterizing the condition of the surface.

By virtue of the three-dimensional surface coordinates generated by the sensor arrangement, in the disclosed method a two-dimensional point lattice is defined for the surface in the environment of the transportation vehicle. The surface coordinates include two horizontal coordinates. The surface coordinates further include a vertical coordinate or elevation coordinate which specifies, for a point defined by the horizontal coordinates, the elevation at which the surface is located. In the following, terms such as "at the top" and "at the bottom" relate to a vertical direction—that is to say, to the direction of action of gravitational force on Earth.

In the disclosed method, a curvature contour of the surface is obtained from the three-dimensional surface coordinates in at least one direction, specifically by an approximation. In contrast to an interpolation, in this case not only are intermediate coordinates obtained between the three-dimensional surface coordinates measured or generated by the sensor arrangement, but by using the three-dimensional surface coordinates as supporting points a curve or area is obtained that only has to approximate to the underlying three-dimensional surface coordinates. In this way, the curvature contour of the real surface in the environment of the transportation vehicle can be reproduced more accurately. For the purpose of characterizing the condition of the surface, the curvature contour obtained in this way and/or vertical separations of the approximation of the curvature contour from the three-dimensional surface coordinates is/are then determined. Since the curve or area of the approximation does not have to pass through the three-dimensional surface coordinate on the basis of which the approximation was obtained, such a vertical separation may arise. The vertical separation is consequently the difference of the elevation coordinates of the three-dimensional surface coordinates and of the curve or area of the approximation for the same horizontal coordinates. The vertical separation also includes an algebraic sign—that is to say, the information as to whether the curve or area of the approximation lies above or below the three-dimensional surface coordinates.

It has been found that the value of this vertical separation in addition to the curvature contour of the approximating curve or area can characterize the condition of the surface in such a way that the surface can be suitably classified with regard to a possible negotiability by the transportation vehicle.

By virtue of the disclosed method it is possible to obtain a reliable determination of the surface contour even in the case of an intense measurement noise in the course of the capture of the surface in the environment of the transportation vehicle. In this way, the condition of the surface in the environment of the transportation vehicle can be determined reliably.

According to a further exemplary embodiment of the disclosed method, the approximation of the curvature contour is carried out on the basis of an approximating spline curve. The approximating spline curve approaches its supporting points. In this case, the supporting points are obtained from the three-dimensional surface coordinates generated by the sensor arrangement, or from a subset of these surface coordinates. The approximating spline curve describes a smooth curve contour which is determined by the supporting points, without the curve necessarily having to pass through the supporting points.

The approximating spline curve may be a so-called basis spline curve, which is also designated as a B-spline curve. In the case of a basis spline curve, use is made of a basis function. For example, for the purpose of determining a point at a particular place on the curve the individual supporting points are weighted on the basis of the values of the basis function at this place. The weighting is chosen in such a way that the influence of a supporting point decreases with increasing distance from the place.

As an extension of the basis spline curve, use may be made of a NURBS (non-uniformly rational B-spline), in the case of which the supporting points have been weighted. Moreover, use may be made of Bézier splines or of so-called P-splines, in the case of which an additional cost function is applied to the basis spline curve.

By virtue of approximating spline curves, the curvature contour of the surface, at least in a certain direction, can be determined very accurately and reliably.

The classification can then be carried out in a manner depending on the curvature contour of the approximating spline curve.

According to at least one exemplary embodiment of the disclosed method, an approximation of the curvature contour in the transverse direction is obtained on the basis of the three-dimensional surface coordinates that extend in the transverse direction relative to a direction of travel of the transportation vehicle. The classification is then carried out in a manner depending on the curvature contour in the transverse direction. The condition of the surface in the environment of the transportation vehicle in the transverse direction is important to ascertain a lateral boundary of a roadway. An unpaved roadway may be bounded by, for instance, ditches, slopes or other surface contours that are not negotiable. By virtue of the approximating determination of the curvature contour in the transverse direction, such lateral boundaries can be determined securely and reliably by the classification.

Alternatively or additionally, an approximation of the curvature contour in the longitudinal direction can also be obtained on the basis of the surface coordinates that extend in the longitudinal direction relative to the direction of travel. In this case, the classification is then carried out, alternatively or additionally, in a manner depending on the curvature contour in the longitudinal direction. By the curvature contour in the longitudinal direction, obstacles in the direction of travel of the transportation vehicle can be detected securely and reliably on the basis of the classification. This is important in the case of the automatic driving of the transportation vehicle, so that the transportation vehicle does not collide with an obstacle in the direction of travel of the transportation vehicle.

According to a further exemplary embodiment of the disclosed method, an approximation of the curvature contour of the entire surface is obtained on the basis of the surface coordinates. On the basis of the three-dimensional surface coordinates, a continuous curved area is consequently calculated that represents the real surface in the environment of the transportation vehicle. In this case, consequently not only each line in the transverse direction and each column in the longitudinal direction—that is to say, in the direction of travel—of an elevation map that is created from the three-dimensional surface coordinates is described by an approximating curve. Rather, the entire elevation map is approximated by an approximating area, in particular, an area formed by spline curves. In this case, the curvature contour can be ascertained in all directions and can be utilized for the classification of the surface coordinates for the purpose of characterizing the condition of the surface.

According to a further exemplary embodiment of the disclosed method, a negotiable region is ascertained on the basis of the curvature contour. A roadway is assigned to a contiguous negotiable region, and a roadway environment is assigned to a region adjacent to the roadway. In the case of an automatic driving of the transportation vehicle, on the basis of this negotiable region the transportation vehicle can be controlled in such a way that only driving maneuvers are executed that ensure that the transportation vehicle is always located on the negotiable region—that is to say, on the roadway.

By a "roadway" in this document, a surface is understood that is suitable to be driven over by the transportation vehicle. The roadway is an unpaved roadway or a so-called off-road roadway. By the "roadway environment", the region adjacent to the roadway is understood the region laterally alongside the roadway with respect to the direction of travel of the transportation vehicle.

According to a further exemplary embodiment of the disclosed method, a group of three-dimensional surface coordinates that, on average, are arranged so far below the approximated curvature contour that a first limiting value is exceeded is assigned to a first class of the classification. Such surface coordinates relate to a surface such as is constituted by a pothole. The limiting value is therefore established in such a way that the measured surface coordinates lie very far below the approximated curvature contour. Moreover, in this case the group of the surface coordinates can be assigned to the first class only when the surface coordinates lie in the negotiable region of the surface—that is to say, on the roadway. Only in this case is, for instance, a pothole relevant for the travel of the transportation vehicle.

According to a further exemplary embodiment of the disclosed method, a region of the surface in which an increasingly declining curvature contour in a defined first interval in the transverse direction is ascertained is assigned to a second class of the classification. The second class is consequently distinguished by a more intensely declining curvature, for example, in the spline curve. By virtue of the second class, regions can therefore be determined that actually correspond to a slope or to a ditch. Such slopes or ditches laterally alongside the roadway are particularly relevant. The first interval is therefore defined in the transverse direction relative to the direction of travel. In this way, a slope or a ditch alongside the roadway—that is to say, in the roadway environment—can be captured. Precisely such slopes or ditches are difficult to capture if only the three-dimensional surface coordinates that have been generated by the sensor arrangement are taken into consideration.

According to a further exemplary embodiment of the disclosed method, a region of the surface in which an increasingly rising curvature contour and an increasingly declining curvature contour in a defined second interval of a surface direction are ascertained is assigned to a third class of the classification. The second interval is defined in a surface direction on the roadway. In this way, a bump or a pothole can be captured, in the case of which an increasingly rising and an increasingly declining curvature contour are present within an interval. In contrast to a pothole, however, the three-dimensional surface coordinates do not lie so far below the approximated curvature contour that the region that includes the surface coordinates would have to be assigned to the first class.

According to a further exemplary embodiment of the disclosed method, a region of the surface in which an abrupt rise in the elevation coordinate of several adjacent surface coordinates is ascertained is assigned to a fourth class of the classification. Such an abrupt rise in the elevation coordinate occurs in the case of relatively large obstacles such as parked transportation vehicles or trees. The capture of the region of the surface of the fourth class can serve, on the one hand, to delimit the roadway environment from the roadway. On the other hand, obstacles in the direction of travel of the transportation can be detected in this way.

According to a further exemplary embodiment of the disclosed method, a roadway condition is ascertained on the basis of the value of the scattering of the vertical separation of the approximation of the curvature contour from the surface coordinates. For instance, in this case the vertical deviation of the approximation of the curvature contour can be determined for each surface coordinate. In this way, the value of the roughness of the roadway and/or the value of the average irregularity of the roadway, for instance, can be obtained. If the values of the roughness or the values of the average irregularities exceed a certain limiting value, it can be concluded from this that the surface is no longer negotiable for the transportation vehicle in question.

According to a further exemplary embodiment of the disclosed method, three-dimensional surface coordinates are generated temporally in succession, and in each instance—that is to say, for each set of three-dimensional surface coordinates that has been recorded at a certain time—an approximation of the curvature contour is obtained. An obstacle is subsequently identified on the basis of the curvature contour and/or the vertical separations of the approximation of the curvature contour from the three-dimensional surface coordinates, and the motion of the obstacle is ascertained on the basis of the temporal progression of the three-dimensional surface coordinates assigned to the obstacle. Moving obstacles can be tracked in this way by several series of measurements in which the obstacle is detected.

According to a further exemplary embodiment of the disclosed method, the positions of the contact surfaces of the wheels of the transportation vehicle on the surface are determined. The prospective trajectories of the positions of the contact surfaces of the wheels of the transportation vehicle are subsequently ascertained, and for the prospective trajectories the negotiability of the surface is checked on the basis of the classification of the surface coordinates pertaining to the trajectories. The positions of the contact surfaces of the wheels of the transportation vehicle can be determined geometrically, since the position of the sensor arrangement relative to the contact surfaces of the wheels of the transportation vehicle is known. From the direction of motion and, where appropriate, the speed of the transportation vehicle, the prospective trajectories of the contact surfaces of the wheels can then be ascertained. As elucidated above, it can now be determined whether potholes or relatively large obstacles that restrict the negotiability of the surface or that have the consequence that the surface is no longer negotiable are located on these prospective trajectories. This information can then be taken into consideration in the course of the automatic driving of the transportation vehicle, to avoid corresponding potholes or obstacles.

According to a further exemplary embodiment of the disclosed method, the three-dimensional surface coordinates are generated by a stereoscopic image. This has the benefit that the three-dimensional surface coordinates can be ascertained by a very inexpensive sensor arrangement. In addition, image data are provided in this way that can be used for further purposes. However, the three-dimensional surface coordinates that have been obtained by a stereoscopic image have the drawback that the measuring inaccuracies are too great for the three-dimensional surface coordinates obtained to suffice as a basis for the control of the automatic driving. In addition, slopes and other lateral boundaries of a roadway can only be detected inadequately. Furthermore, potholes and ditches are no longer detected reliably in the case of measurement noise that is too intense. In the case of the disclosed method, however, the generated three-dimensional surface coordinates are processed further. An approximation of the curvature contour of the surface is carried out. By this way, the data of the stereoscopic image can be prepared in such a way that dangerous regions—such as, for example, slopes, large holes or lateral drainage ditches—in the prospective track of the vehicle can be detected early and bypassed. In this way, the measurement problems of conventional, stereoscopic-camera-based measuring systems can be overcome. By the approximation of the curvature contour, a reliable estimation of the surface contour and of a possible grade can be carried out in this case, even in the event of intense measurement noise.

Moreover, the three-dimensional surface coordinates can be obtained by a laser scanner which scans the surface in the direction of travel in the transverse direction. It is a benefit of this type of acquisition of the three-dimensional surface coordinates that they also work in bad weather conditions and at night. The scanning density is lower in comparison with the use of a stereoscopic camera in the direction of travel—that is to say, orthogonally to the direction of rotation of the scanning system. This can have the consequence that ditches and potholes are not detected. In the case of the disclosed method, however, by virtue of the approximation of the curvature contour it is ensured that such surface conditions can be detected reliably. The use of the laser scanner has the benefit, in addition, that abrupt changes of elevation in the surface can be detected very reliably.

The disclosed device for determining the condition of a surface in the environment of a transportation vehicle is characterized by an arithmetic-logic unit, which is designed to obtain an approximation of the curvature contour of the surface in at least one direction on the basis of the three-dimensional surface coordinates, and a classification unit, by which a classification of the three-dimensional surface coordinates on the basis of the curvature contour and/or vertical separations of the approximation of the curvature contour from the three-dimensional surface coordinates can be carried out for the purpose of characterizing the condition of the surface.

The disclosed device is designed to execute the disclosed method as described above. The device therefore presents the same benefits as the disclosed method.

The sensor arrangement of the disclosed device includes a stereoscopic camera. Furthermore, a scanning laser measuring system or a laser-cutting-based measuring system can also be employed as sensor arrangement. The laser-cutting-based measuring system has the benefit that it can capture the ground level very accurately. However, it has only a very limited range. In addition, the construction-space requirement of such a measuring system is relatively large.

The disclosed method and the disclosed device are employed in a transportation vehicle, in particular, in a truck, that has a system for automatic driving. In this way, the transportation vehicle is able to drive automatically on an unpaved roadway without a driver. The system for automatic driving is assisted by the disclosed method and by the disclosed device. Information is provided concerning the condition of the surface in the direction of travel of the transportation vehicle. In this connection, which region of this surface is negotiable and is consequently suitable as a roadway is ascertained. Furthermore, the condition of the roadway environment is ascertained, so that the surface in the environment of the transportation vehicle that is suitable for driving maneuvers in the course of automatic driving can be taken into consideration in connection with the control of the transportation vehicle.

For this purpose, the disclosed device may have been integrated within the transportation vehicle that has the system for automatic driving. The sensor arrangement captures the surface of the undersurface in the direction of travel of the transportation vehicle, in which connection lateral regions ahead of the transportation vehicle are also captured.

Figure 2:
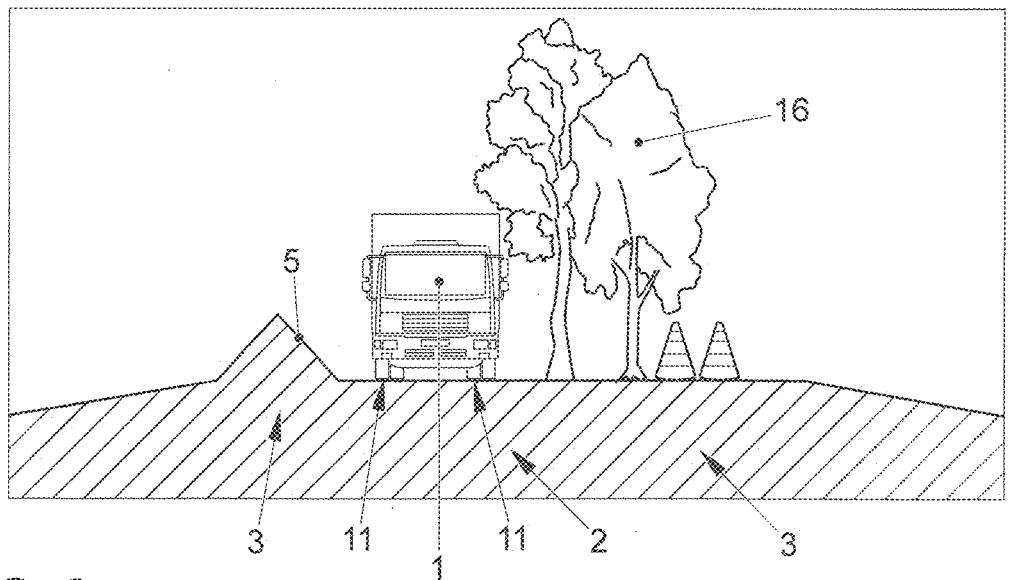
FIG. 2 shows another situation in which the disclosed method can be employed.

In the following, the situation in which the disclosed method is carried out will firstly be elucidated with reference to FIGS. 1 and 2:

A transportation vehicle 1 is driving over an unpaved surface. The transportation vehicle 1 can, for instance, drive automatically without the assistance of a driver. The unpaved surface comprises a roadway 2 and, laterally alongside it in the direction of travel, a roadway environment 3. This roadway environment 3 borders the roadway 2. In the example shown in FIG. 1, the roadway environment 3 includes ditches 4 laterally alongside the roadway 2. In the example shown in FIG. 2, the roadway 2 is bounded laterally by an embankment 5 and by trees 16 or pylons. In the course of driving over the surface, the wheels of the transportation vehicle 1 constitute contact surfaces 11 on the roadway 2.

As will be elucidated in the following, by the exemplary embodiment of the disclosed method and by the exemplary embodiment of the disclosed device it can be detected which region of the surface in the direction of travel of the transportation vehicle 1 is negotiable and can therefore be assigned to the roadway. Furthermore, the condition of the surface of the roadway 2 and also the condition of the roadway environment 3 can be determined.

Figure 3:
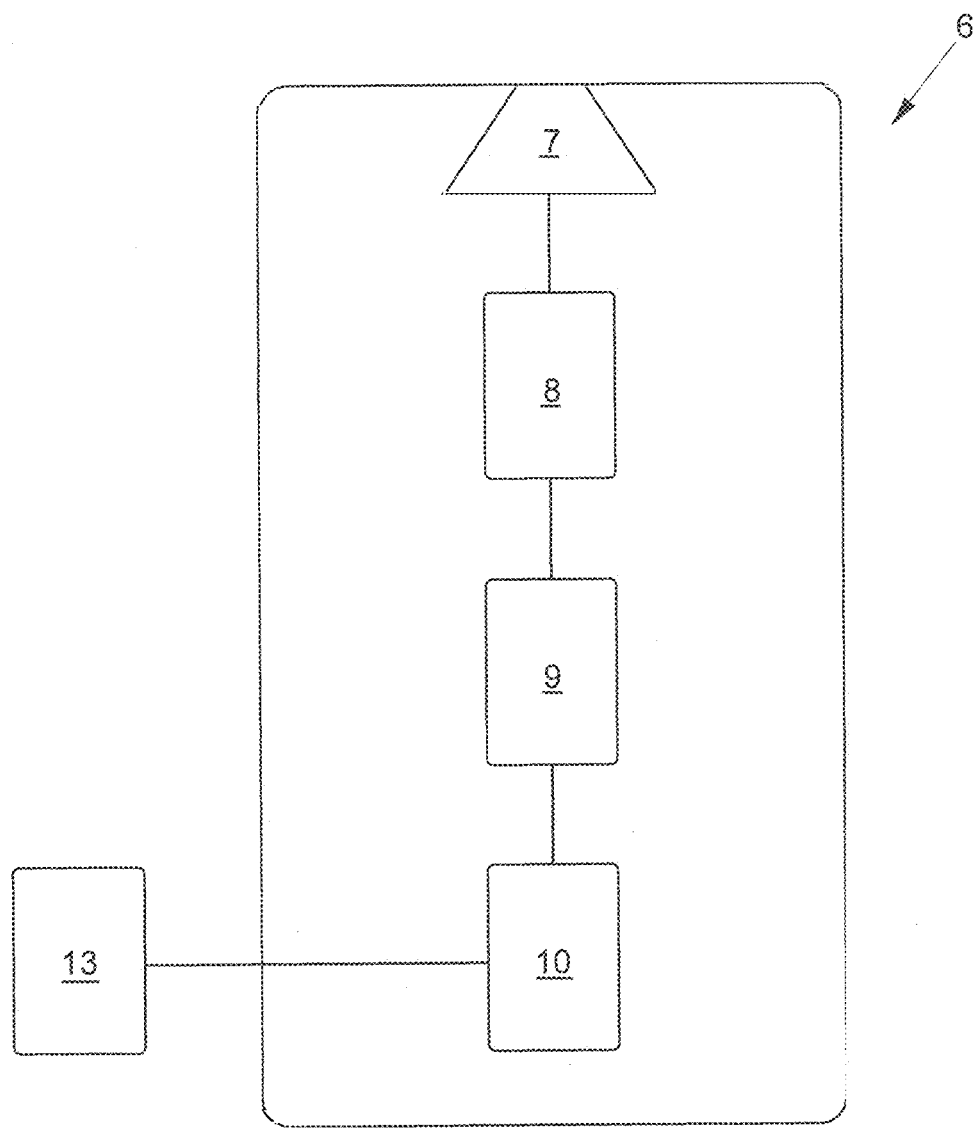
FIG. 3 shows schematically the structure of an exemplary embodiment of the disclosed device.

With reference to FIG. 3, an exemplary embodiment of the device 6 will be elucidated:

The device 6 includes a stereoscopic camera 7 and an image-processing unit 8 connected thereto. The stereoscopic camera 7 and the image-processing unit 8 form a sensor arrangement, by which three-dimensional surface coordinates of the surface in the environment of the transportation vehicle 1, in particular, in the direction of travel of the transportation vehicle 1, are capable of being generated. By the sensor arrangement, a three-dimensional elevation map of the surface in the direction of travel of the transportation vehicle 1 can consequently be obtained.

The image-processing unit 8 is connected to an arithmetic-logic unit 9 to which it transmits the three-dimensional surface coordinates. The arithmetic-logic unit 9 is designed to obtain an approximation of the curvature contour of the surface on the basis of the three-dimensional surface coordinates, as will be elucidated later with reference to the exemplary embodiment of the disclosed method.

The arithmetic-logic unit 9 is connected to a classification unit 10, by which a classification of the surface coordinates on the basis of the curvature contour and the vertical separations of the approximation of the curvature contour from the three-dimensional surface coordinates is carried out for the purpose of delimiting the roadway 2 from the roadway environment 3 and for the purpose of characterizing the condition of the surface, as will also be elucidated later with reference to the exemplary embodiment of the disclosed method.

In other disclosed embodiments, the sensor arrangement may also use a scanning laser measuring system, a laser-cutting-based measuring system or another measuring system with which three-dimensional surface coordinates can be obtained.

Finally, the device 6 may have been coupled with a controller 13 for the automatic driving of the transportation vehicle 1. All the data relating to the condition of the surface, in particular, of the roadway 2 and of the roadway environment 3, are transmitted to this controller 13.

An exemplary embodiment of the disclosed method, which can be executed by the device 6 described above, will be elucidated in the following with reference to FIGS. 4 to 8:

The stereoscopic camera 7 of the sensor arrangement records, from the transportation vehicle 1, temporally consecutive stereoscopic images in the direction of travel. Such images in various driving situations are shown in FIGS. 4, 5, 7 and 8. The image-processing unit 8 processes the stereoscopic image in a manner known as such, and obtains three-dimensional surface coordinates. In this connection, for a horizontal lattice the elevation coordinate for each point of the lattice is determined. Between the points of the horizontal lattice a separation arises which is determined by the resolution of the stereoscopic camera and by the subsequent image-processing. The reconstructed elevation maps, which are constituted by the three-dimensional surface coordinates and which were obtained from the images of the stereoscopic camera 7, are represented as a grid 17 in the images shown in FIGS. 4, 5, 7 and 8.

The three-dimensional surface coordinates include coordinates in the transverse direction relative to the direction of travel. These three-dimensional surface coordinates in the transverse direction are also designated as a line of the three-dimensional elevation map which is formed by the three-dimensional surface coordinates. Furthermore, the three-dimensional surface coordinates include coordinates in the longitudinal direction relative to the direction of travel. These coordinates are also designated as a column of the three-dimensional elevation map.

In the disclosed method, an approximation of the curvature contour of the surface in at least one direction is obtained on the basis of the three-dimensional surface coordinates. In the present disclosed embodiment, this approximation of the curvature contour is carried out line-by-line—that is to say, in the transverse direction relative to the direction of travel. The three-dimensional surface coordinates of a line are used as supporting points for an approximating spline curve. In the disclosed embodiment, use is made of a basis spline curve. However, use may also be made of other approximating spline curves, as mentioned in the introduction. In this way, a continuous spline curve arises for each line of the three-dimensional elevation map.

Figure 6:
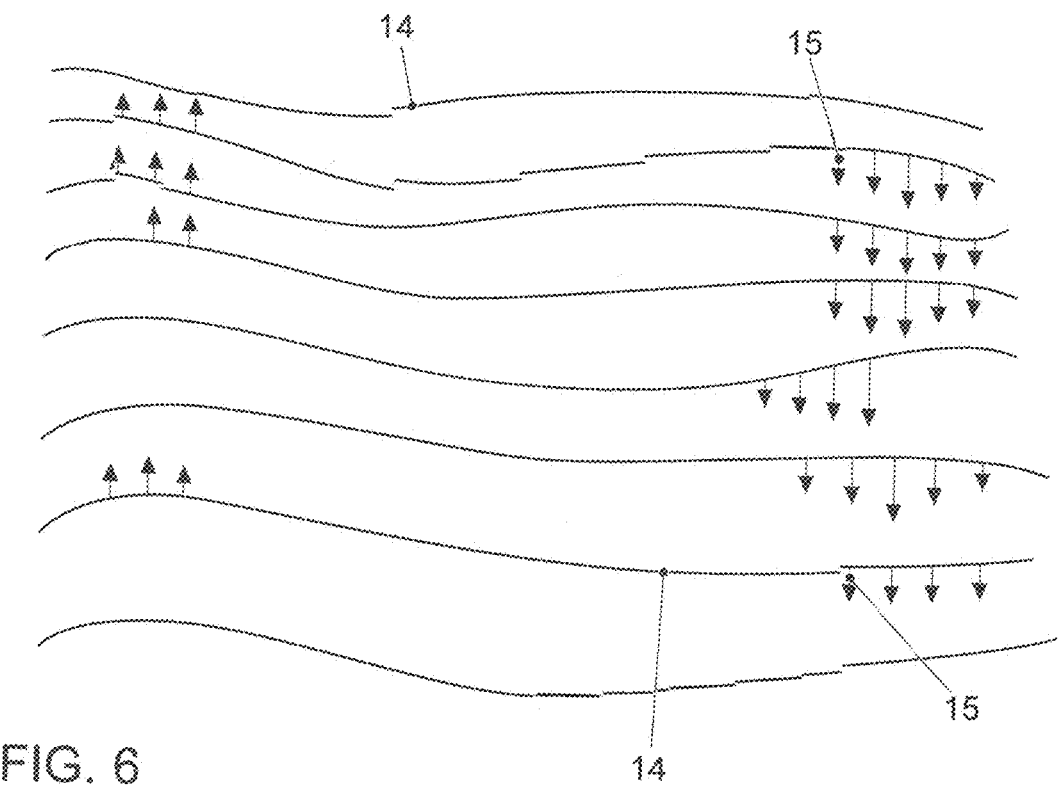
FIG. 6 illustrates the approximation of the curvature contour of the surface as carried out in the exemplary embodiment of the disclosed method.

In FIG. 6, such spline curves 14 are represented schematically for several lines of a three-dimensional elevation map. The approximating spline curve 14 is distinguished in that although it is determined from its supporting points—that is to say, the three-dimensional surface coordinates of a line—it does not necessarily extend through these three-dimensional surface coordinates. For each one of the three-dimensional surface coordinates of each line, a vertical separation from the approximating spline curve 14 may consequently arise. The value of this vertical separation is represented in FIG. 6 by the length of the arrows 15 in the case of a corresponding three-dimensional surface coordinate.

With the aid of the approximating spline curves 14, a continuous surface can consequently be modeled, line-by-line, from the three-dimensional surface coordinates. Moreover, the curvature contour can also be approximated in several directions, so that it is also possible to model a continuous surface from the three-dimensional surface coordinates. This is possible even when a relatively intense measurement noise was present in the course of the generation of the three-dimensional surface coordinates. The contour of the spline curves 14 now permits a division of the measured three-dimensional surface coordinates—that is to say, of the three-dimensional elevation map—on the basis of various criteria. On the one hand, the vertical separation of a three-dimensional surface coordinate from the spline curve 14 can be taken into consideration. On the other hand, the curvature contour of the spline curves 14 can be taken into consideration.

The classification of the three-dimensional surface coordinates for the purpose of characterizing the condition of the surface, as carried out by the classification unit 10, will be elucidated in the following:

A negotiable region for the transportation vehicle 1 is firstly ascertained on the basis of the curvature contour of the spline curves 14. A contiguous negotiable region is defined as roadway 2. The non-negotiable environment of this negotiable region is defined as roadway environment 3.

If an individual three-dimensional surface coordinate in the vertical direction deviates considerably from its adjacent three-dimensional surface coordinates, this three-dimensional surface coordinate is classified as an outlier and subsequently disregarded.

The three-dimensional surface coordinates obtained can, in addition, be temporally filtered, to correct misclassifications of individual three-dimensional surface coordinates.

A group of three-dimensional surface coordinates that are arranged, on average, so far below the approximated curvature contour—that is to say, below the spline curves 14—that a first limiting value is exceeded is assigned to a first class. Surface coordinates that form a pothole that should not be traveled over by the transportation vehicle 1 fall into this class. The first limiting value can be obtained by measurements, carried out in advance, in respect of potholes that have a certain depth. In this case, three-dimensional surface coordinates that extend in the longitudinal direction relative to the direction of travel are taken into consideration.

Moreover, a region of the surface is determined in which an increasingly declining curvature contour in a defined first interval in the transverse direction was determined. This region is assigned to a second class of the classification. The second class is intended to capture lateral slopes and ditches. The first interval therefore extends in the transverse direction. The curvature contour is determined on the basis of a spline curve 14 that was obtained from a line of the three-dimensional elevation map of the three-dimensional surface coordinates. If this spline curve exhibits a more strongly declining curvature, it is inferred that there is a slope or ditch in this region.

Furthermore, a region of the surface is ascertained in which an increasingly rising curvature contour and an increasingly declining curvature contour in a defined second interval of a surface direction are ascertained. This region is assigned to a third class of the classification. This third class denotes bumps, relatively small potholes or vegetation. The second interval has been chosen in such a way that it extends in an arbitrary surface direction and is arranged on the roadway 2. The third class may alternatively comprise only regions of the surface that are distinguished by a more strongly rising curvature in the spline curve 14.

Furthermore, a region of the surface is determined in which an abrupt rise in the elevation coordinate of several adjacent surface coordinates is ascertained. This region is assigned to a fourth class of the classification. The fourth class comprises relatively large obstacles such as, for instance, parked transportation vehicles, trees or such like. Relatively large obstacles of such a type can be ascertained both on the roadway 2 and in the roadway environment 3.

Finally, the condition of the roadway is ascertained on the basis of the value of the scattering of the vertical separation of the spline curves 14 from the respective surface coordinates. In this way, a value of the roughness of the roadway and a value of the average irregularity of the roadway can be obtained.

The three-dimensional surface coordinates are generated in temporal succession by the sensor arrangement. While the transportation vehicle 1 is traveling, stereoscopic images are recorded sequentially, and the three-dimensional surface coordinates are obtained therefrom. For each stereoscopic image—that is to say, for each set of three-dimensional elevation coordinates—the curvature contour is approximated by spline curves 14. On the basis of this curvature contour and the vertical separation of the spline curve 14 from the respective three-dimensional surface coordinate, an obstacle can be identified, as elucidated above. The motion of the obstacle can then be ascertained from the temporal progression of the three-dimensional surface coordinates assigned to the obstacle. Obstacles can be temporally tracked in this way.

The classification unit 10 consequently generates a classification of the three-dimensional surface coordinates of the three-dimensional elevation map on the basis of their vertical position relative to the approximating spline curve 14 and also on the basis of the contour of the spline curve 14 on the basis of the curvature contour of the spline curve 14.

Figure 4:
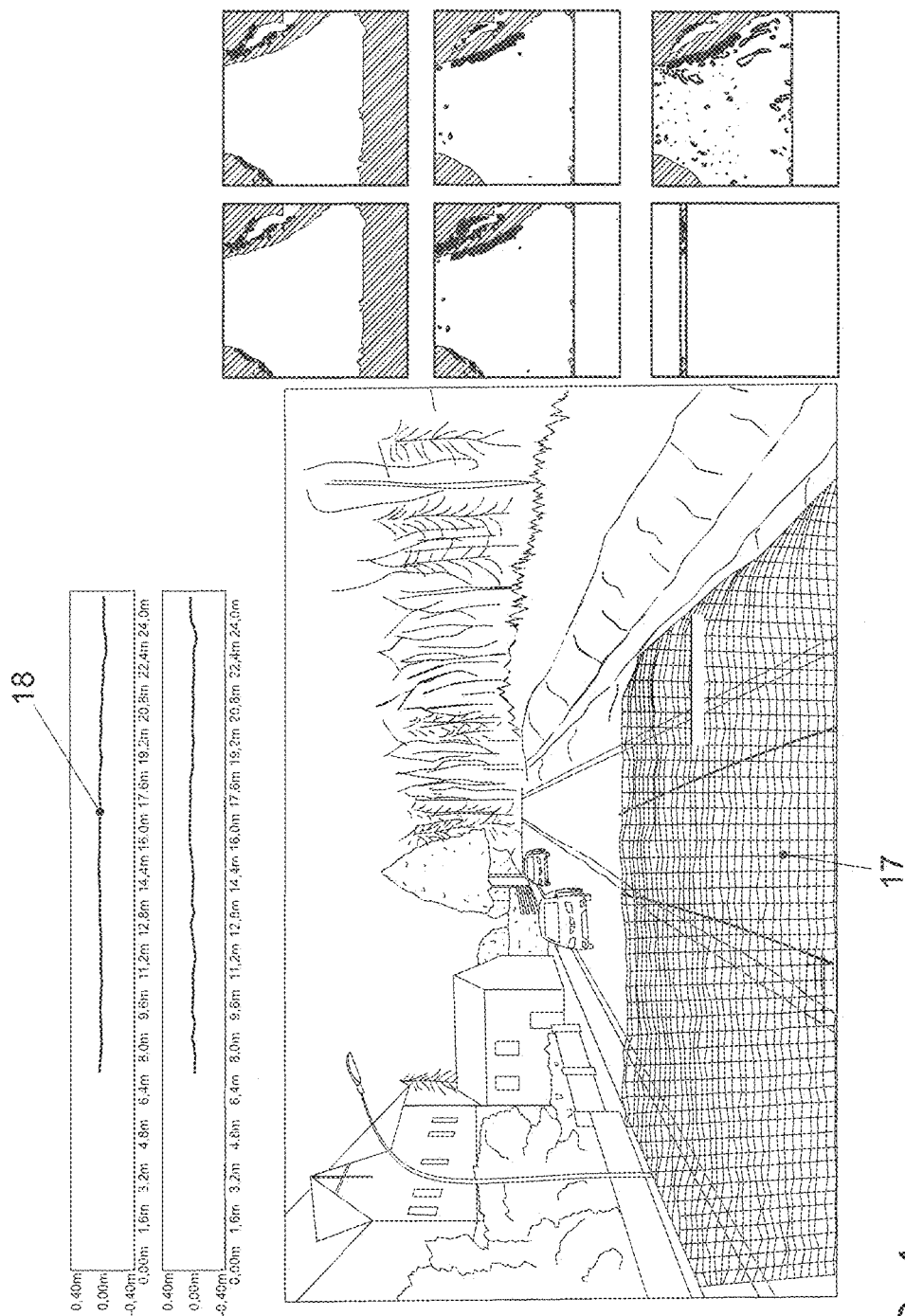
FIG. 4 shows an example of a reconstructed elevation map as obtained in an exemplary embodiment of the disclosed method.

In FIG. 4, an example is shown in which the image recorded by the stereoscopic camera 7 is represented in the left-hand part. Superimposed on this image, a reconstructed elevation map—that is to say, the grid 17 formed from the three-dimensional surface coordinates—has been overlaid. Furthermore, a lateral elevation profile 18 has been overlaid in the image. To the right of the image, the classification of the three-dimensional surface coordinates is represented on the basis of a grayscale image. The representation shown in FIG. 4 relates to a driving situation on a country road, in which the roadway 2 is bounded laterally by a ditch and also by a sidewalk. In the grayscale images to the right alongside the reproduced image, the differing classifications can be clearly discerned. The negotiable region—that is to say, the roadway 2—can be clearly identified.

Figure 5:
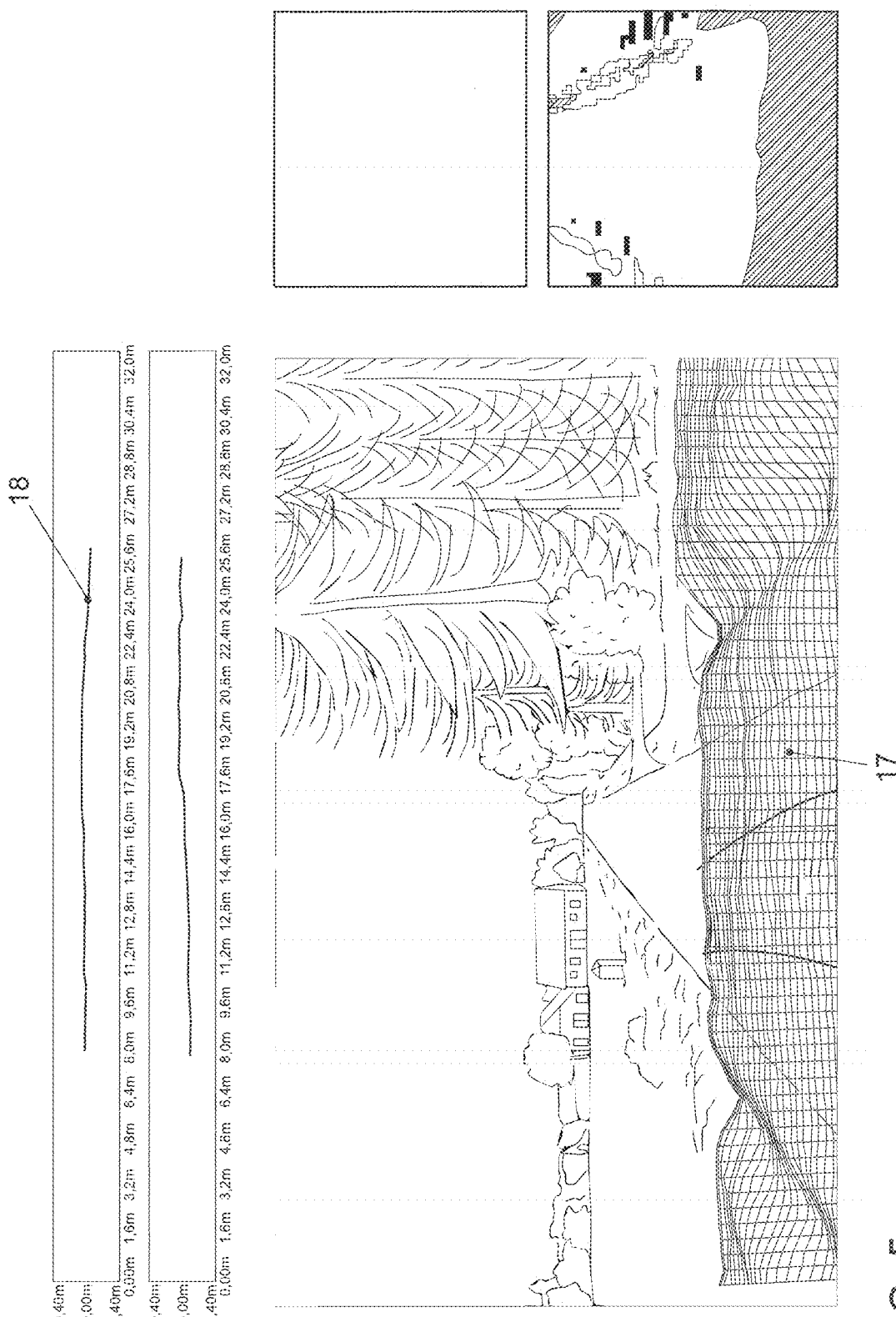
FIG. 5 shows another example of a reconstructed elevation map as obtained in the exemplary embodiment of the disclosed method.

In FIG. 5, a corresponding picture is represented for a driving situation on an unpaved road with lateral ditches.

The image on the right at the bottom in FIG. 5 shows the classification of three-dimensional surface coordinates. The two ditches to the right and to the left of the roadway 2 can be clearly discerned. Located in between them are the three-dimensional surface coordinates that were classified as negotiable region—that is to say, as roadway 2.

Figure 7:
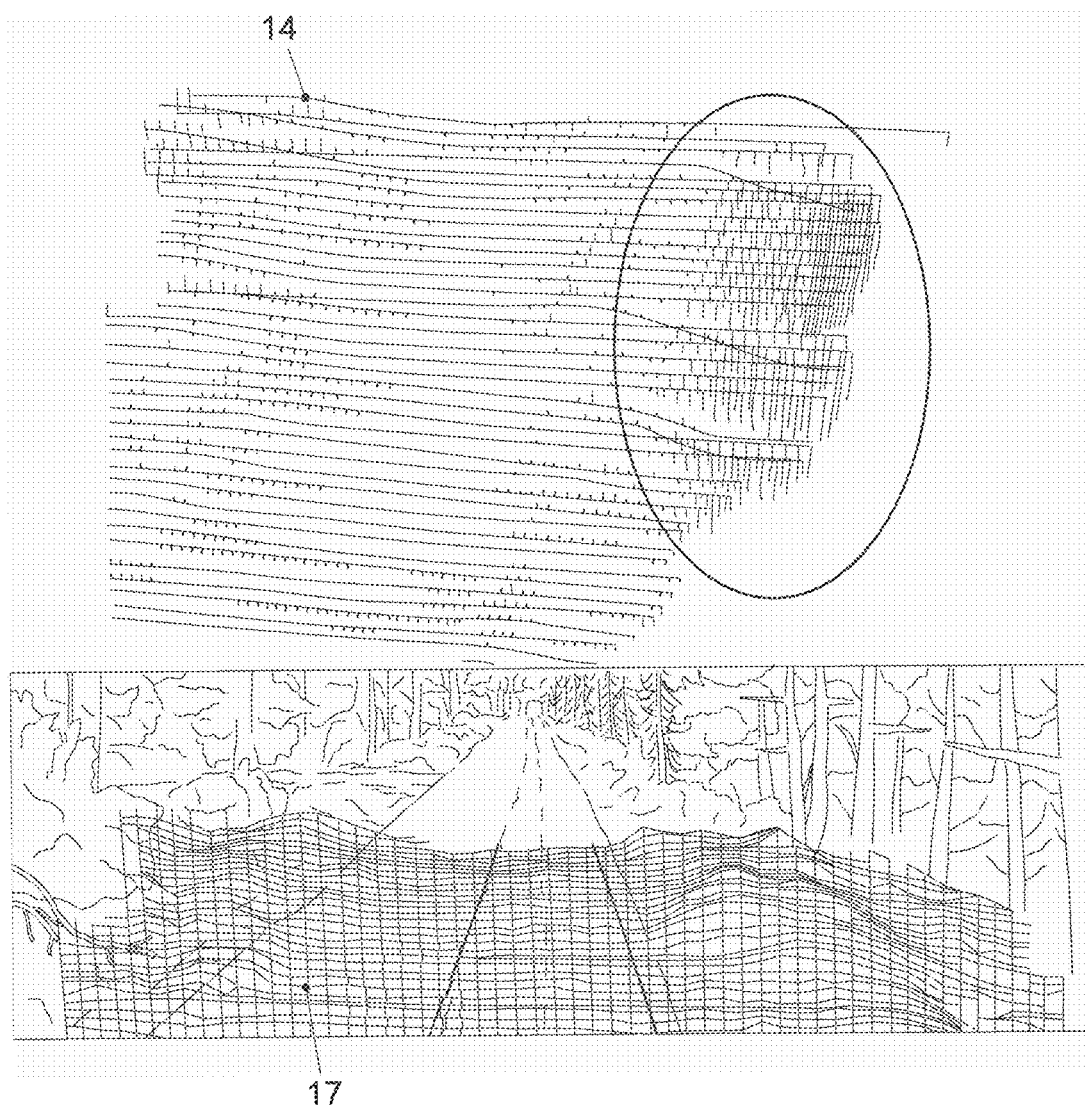
FIG. 7 illustrates the approximation of the curvature contour of the surface in an off-road situation as carried out in the exemplary embodiment of the disclosed method.

In FIG. 7, the image recorded by the stereoscopic camera 7 in a driving situation of an off-road path with a lateral gradient on the right alongside the roadway 2 is represented at the bottom. Also in this case, the three-dimensional elevation map has been inserted into the image on the basis of a grid 17. In the upper part of FIG. 7, the spline curves 14 for the representation of the roadway 2 and of the roadway environment 3 are represented. In the right-hand part of these spline curves 14 the considerable lateral gradient can be inferred on the basis of the curvature contour of the spline curves 14 and on the basis of the vertical separations of the three-dimensional surface coordinates from the spline curves 14. This region is classified as non-negotiable.

Figure 8:
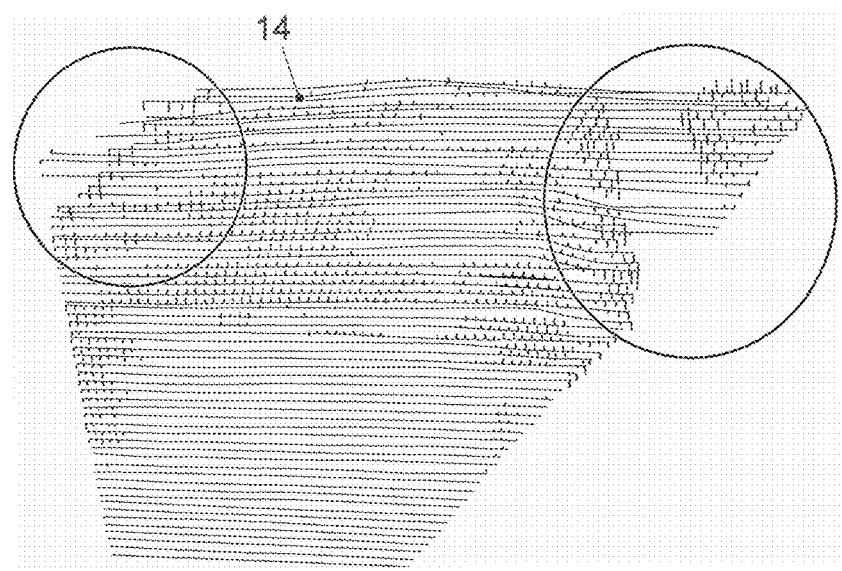
FIG. 8 illustrates the approximation of the curvature contour of the surface as carried out in the exemplary embodiment of the disclosed method in the course of driving along a country road with lateral ditches.
Figure 8:
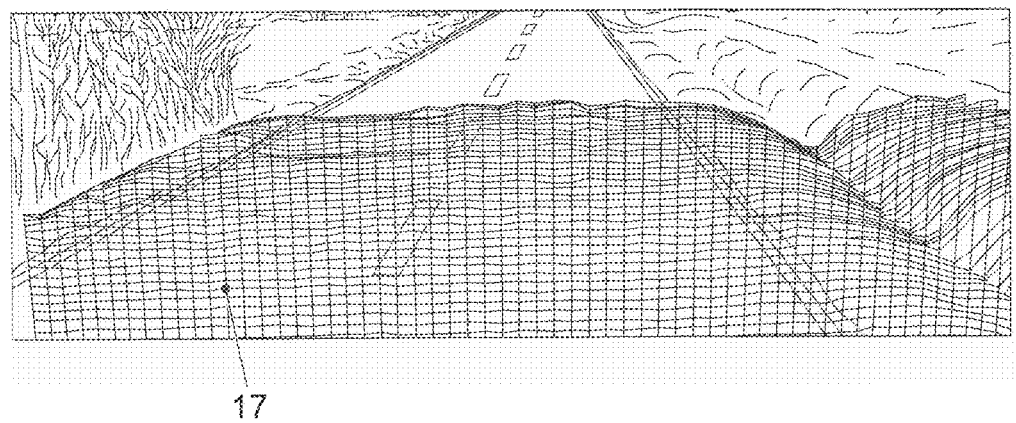

In FIG. 8 the image of the stereoscopic camera 7 for a driving situation on a country road with lateral ditches to the right and to the left alongside the roadway 2 is represented. Once again, the three-dimensional elevation map has been represented on the basis of a grid 17, superimposed on the image. Above the image, the associated spline curves 14 for the representation of the environment are represented. In the top-right and top-left regions a large deviation arises of the elevation coordinate of the three-dimensional surface coordinate from the corresponding elevation coordinate of the spline curves 14. In this way, the lateral ditches are detected, and the assigned three-dimensional surface coordinates are classified correspondingly.

In the case of a deployment of the disclosed method and of the disclosed device in a transportation vehicle 1 that drives automatically, the contact surfaces 11 of the wheels of the transportation vehicle 1 on the surface are determined. In this connection, a spatial relation between the three-dimensional surface coordinates and the contact surfaces 11 of the wheels of the transportation vehicle 1 is ascertained from the spatial arrangement of the contact surfaces 11 of the wheels relative to the stereoscopic camera 7 and to the viewing-angle of the stereoscopic camera 7. The prospective trajectories of the contact surfaces 11 of the wheels of the transportation vehicle 1 are ascertained on the basis of the data that are present in the control unit 13. For this region—that is to say, for the prospective trajectories—the negotiability of the surface is then checked by the classification unit 10. In this connection, the classification of the three-dimensional surface coordinates that lie on the prospective trajectories of the contact surfaces 11 of the wheels of the transportation vehicle 1 is taken into consideration. Furthermore, an adjacent region may be taken into consideration for this purpose. If, for instance, it turns out that a pothole is situated on such a trajectory, an appropriate signal is transmitted to the control unit 13. The latter can then execute a driving maneuver automatically, in the course of which the pothole is bypassed. Furthermore, on the basis of the data transmitted from the classification unit 10 the control unit 13 can ensure that the transportation vehicle 1 is moved automatically on a negotiable region—that is to say, on the roadway 2. In addition, the roadway environment 3 can be taken into consideration in the course of driving maneuvers. For instance, a tree that borders the roadway 2 laterally can also be taken into consideration in such a way that the automatically driving transportation vehicle 1 does not collide with this obstacle on the side or at the top, even if the contact surfaces 11 of the wheels of the transportation vehicle 1 are located completely on the roadway 2.

The disclosed method and the device 6 are used in an off-road deployment of trucks. For instance, they can be employed in trucks that are deployed in mining. In this case, the trucks may have been equipped with a system for automatic driving that utilizes the device 6 and the disclosed method to control the truck. Moreover, the disclosed method and the device 6 can be used in an off-road deployment of a passenger car and in the course of driving on unpaved ground. In this way, an assistance system can be provided that detects obstacles and potholes reliably and outputs information to the driver concerning the surface of the roadway. Finally, the disclosed method and the device 6 can be used in an off-road deployment of motorcycles and in the course of driving motorcycles on unpaved ground. Also in this case, an assistance system can be provided that detects obstacles and potholes reliably. In the case of a deployment in motorcycles, the assistance system can draw attention to dangerous, particularly deep potholes, and to ground irregularities.

LIST OF REFERENCE SYMBOLS 1 transportation vehicle
2 roadway
3 road environment
4 ditch
5 embankment
6 device
7 stereoscopic camera
8 image-processing unit
9 arithmetic-logic unit
10 classification unit
11 contact surfaces
13 controller
14 spline curve
15 arrow
16 trees
17 grid
18 lateral elevation profile

The invention claimed is:

1. A method for determining a condition of a surface in the environment of a transportation vehicle, the method comprising:
generating three-dimensional surface coordinates of the surface by a sensor arrangement,
obtaining an approximation of the curvature contour of the surface in at least one direction based on the three-dimensional surface coordinates,
carrying out a classification of the three-dimensional surface coordinates based on the curvature contour and/or vertical separations of the approximation of the curvature contour from the three-dimensional surface coordinates to characterize the condition of the surface, and
assigning a group of three-dimensional surface coordinates to a first class of the classification in response to the group of three-dimensional surface coordinates being, on average, arranged to an extent below the approximated curvature contour such that a first limiting value is exceeded.

2. The method of claim 1, wherein the approximation of the curvature contour is carried out based on an approximating spline curve.

3. The method of claim 1, wherein
an approximation of the curvature contour in the transverse direction is obtained based on the three-dimensional surface coordinates that extend in the transverse direction relative to a direction of travel of the transportation vehicle, and
the classification is carried out based on the curvature contour in the transverse direction.

4. The method of claim 1, wherein an approximation of the curvature contour of the entire surface is obtained based on the three-dimensional surface coordinates.

5. The method of claim 1, wherein a negotiable region is ascertained based on the curvature contour, and a roadway is assigned to a contiguous negotiable region, and a roadway environment is assigned to a region adjacent to said roadway.

6. The method of claim 1, further comprising assigning a region of the surface to a second class of the classification in response to ascertaining that the region of the surface has an increasingly declining curvature contour in a defined first interval in the transverse direction.

7. The method of claim 6, further comprising assigning a region of the surface to a third class of the classification in response to ascertaining that the region has an increasingly rising curvature contour and an increasingly declining curvature contour in a defined second interval of a surface direction.

8. The method of claim 7, further comprising assigning a region of the surface to a fourth class of the classification in response to ascertaining that the region has an abrupt rise in the elevation coordinate of several adjacent three-dimensional surface coordinates.

9. The method of claim 1, wherein a roadway condition is ascertained based on the value of the scattering of the vertical separation of the approximation of the curvature contour from the surface coordinates.

10. The method of claim 1,
wherein three-dimensional surface coordinates are generated in temporal succession, and an approximation of the curvature contour is obtained,
wherein an obstacle is identified based on the curvature contour and/or the vertical separations of the approximation of the curvature contour from the three-dimensional surface coordinates, and
wherein a motion of the obstacle is ascertained based on the temporal progression of the three-dimensional surface coordinates assigned to the obstacle.

11. A method for determining a condition of a surface in the environment of a transportation vehicle, the method comprising:
generating three-dimensional surface coordinates of the surface by a sensor arrangement,
obtaining an approximation of the curvature contour of the surface in at least one direction based on the three-dimensional surface coordinates, and
carrying out a classification of the three-dimensional surface coordinates based on the curvature contour and/or vertical separations of the approximation of the curvature contour from the three-dimensional surface coordinates to characterize the condition of the surface,
wherein the positions of the contact surfaces of the wheels of the transportation vehicle on the surface are determined,
wherein the prospective trajectories of the positions of the contact surfaces of the wheels of the transportation vehicle are ascertained, and
wherein the negotiability of the surface is checked for the prospective trajectories based on the classification of the three-dimensional surface coordinates pertaining to the trajectories.

12. The method of claim 1, wherein the three-dimensional surface coordinates are generated by a stereoscopic image.

13. A device for determining a condition of a surface in the environment of a transportation vehicle, the device comprising:
a sensor arrangement by which three-dimensional surface coordinates of the surface are generated;
an arithmetic-logic unit configured to obtain an approximation of the curvature contour of the surface in at least one direction based on the three-dimensional surface coordinates, and
a classification unit by which a classification of the three-dimensional surface coordinates based on the curvature contour and/or vertical separations of the approximation of the curvature contour from the three-dimensional surface coordinates is configured for being carried out for the purpose of characterizing the condition of the surface,
wherein a group of three-dimensional surface coordinates is assigned to a first class of the classification in response to the group of three-dimensional surface coordinates being, on average, arranged to an extent below the approximated curvature contour such that a first limiting value is exceeded.

14. The device of claim 13, wherein the sensor arrangement includes a stereoscopic camera.

15. The device of claim 14, wherein the approximation of the curvature contour is carried out based on an approximating spline curve.

16. The device of claim 14, wherein
an approximation of the curvature contour in the transverse direction is obtained based on the three-dimensional surface coordinates that extend in the transverse direction relative to a direction of travel of the transportation vehicle, and
the classification is carried out based on the curvature contour in the transverse direction.

17. The device of claim 13, wherein an approximation of the curvature contour of the entire surface is obtained based on the three-dimensional surface coordinates.

18. The device of claim 13, wherein a negotiable region is ascertained based on the curvature contour, and a roadway is assigned to a contiguous negotiable region, and a roadway environment is assigned to a region adjacent to said roadway.

19. The device of claim 13, wherein a region of the surface is assigned to a second class of the classification in response to ascertainment that the region of the surface has an increasingly declining curvature contour in a defined first interval in the transverse direction.

20. The device of claim 19, wherein a region of the surface is assigned to a third class of the classification in response to ascertainment that the region has an increasingly rising curvature contour and an increasingly declining curvature contour in a defined second interval of a surface direction.

21. The device of claim 20, wherein a region of the surface is assigned to a fourth class of the classification in response to ascertainment that the region has an abrupt rise in the elevation coordinate of several adjacent three-dimensional surface coordinates.

22. The device of claim 13, wherein a roadway condition is ascertained based on the value of the scattering of the vertical separation of the approximation of the curvature contour from the surface coordinates.

23. The device of claim 13,
wherein three-dimensional surface coordinates are generated in temporal succession, and an approximation of the curvature contour is obtained,
wherein an obstacle is identified based on the curvature contour and/or the vertical separations of the approximation of the curvature contour from the three-dimensional surface coordinates, and
wherein a motion of the obstacle is ascertained based on the temporal progression of the three-dimensional surface coordinates assigned to the obstacle.

24. A device for determining a condition of a surface in the environment of a transportation vehicle, the device comprising:
a sensor arrangement by which three-dimensional surface coordinates of the surface are generated;
an arithmetic-logic unit configured to obtain an approximation of the curvature contour of the surface in at least one direction based on the three-dimensional surface coordinates, and
a classification unit by which a classification of the three-dimensional surface coordinates based on the curvature contour and/or vertical separations of the approximation of the curvature contour from the three-dimensional surface coordinates is configured for being carried out for the purpose of characterizing the condition of the surface,
wherein the positions of the contact surfaces of the wheels of the transportation vehicle on the surface are determined,
wherein the prospective trajectories of the positions of the contact surfaces of the wheels of the transportation vehicle are ascertained, and
wherein the negotiability of the surface is checked for the prospective trajectories based on the classification of the three-dimensional surface coordinates pertaining to the trajectories.

* * * * *